(No Model.) 4 Sheets—Sheet 1.
A. H. EMERY.
MACHINE FOR TESTING THE STRENGTH OF MATERIALS.
No. 278,917. Patented June 5, 1883.
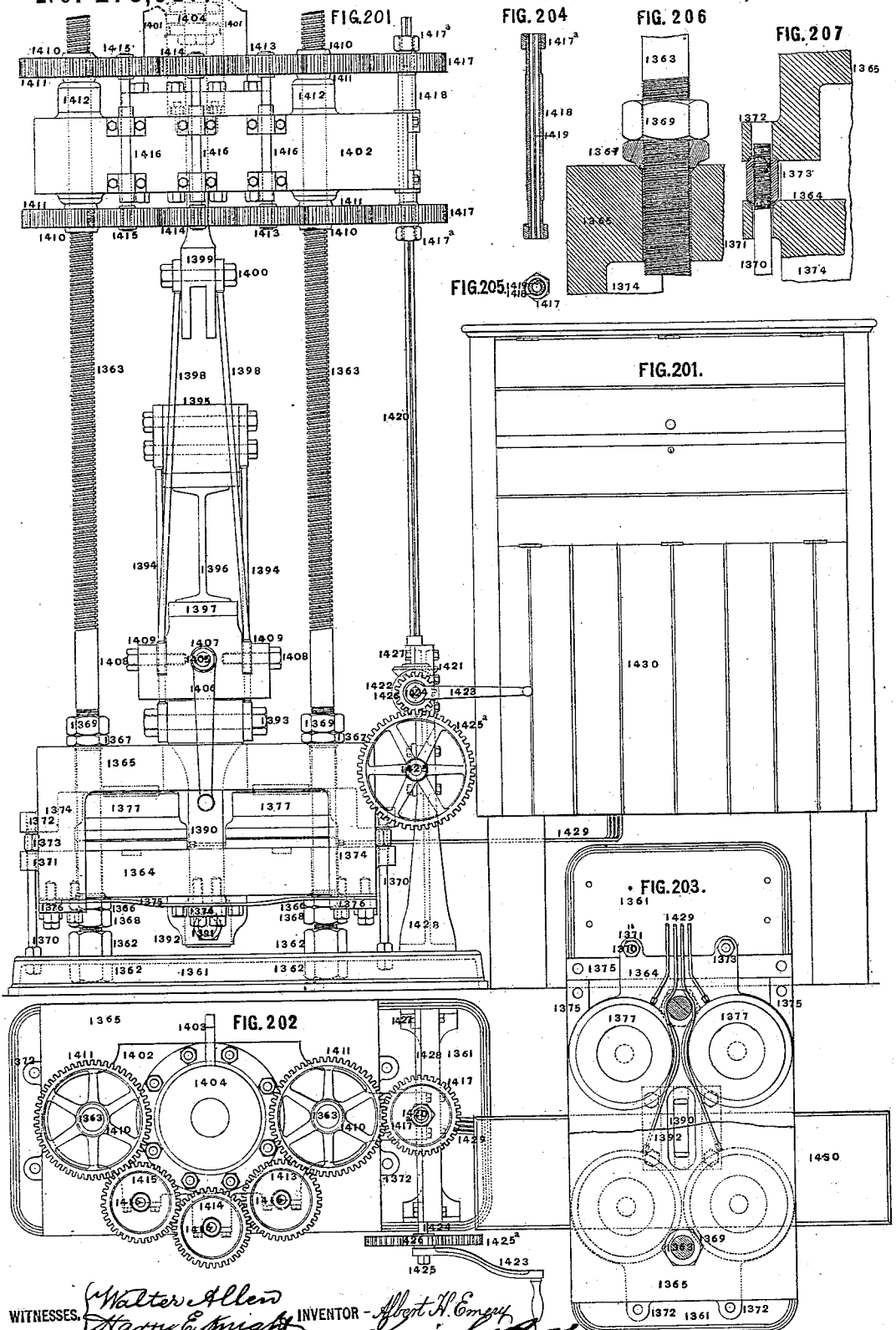

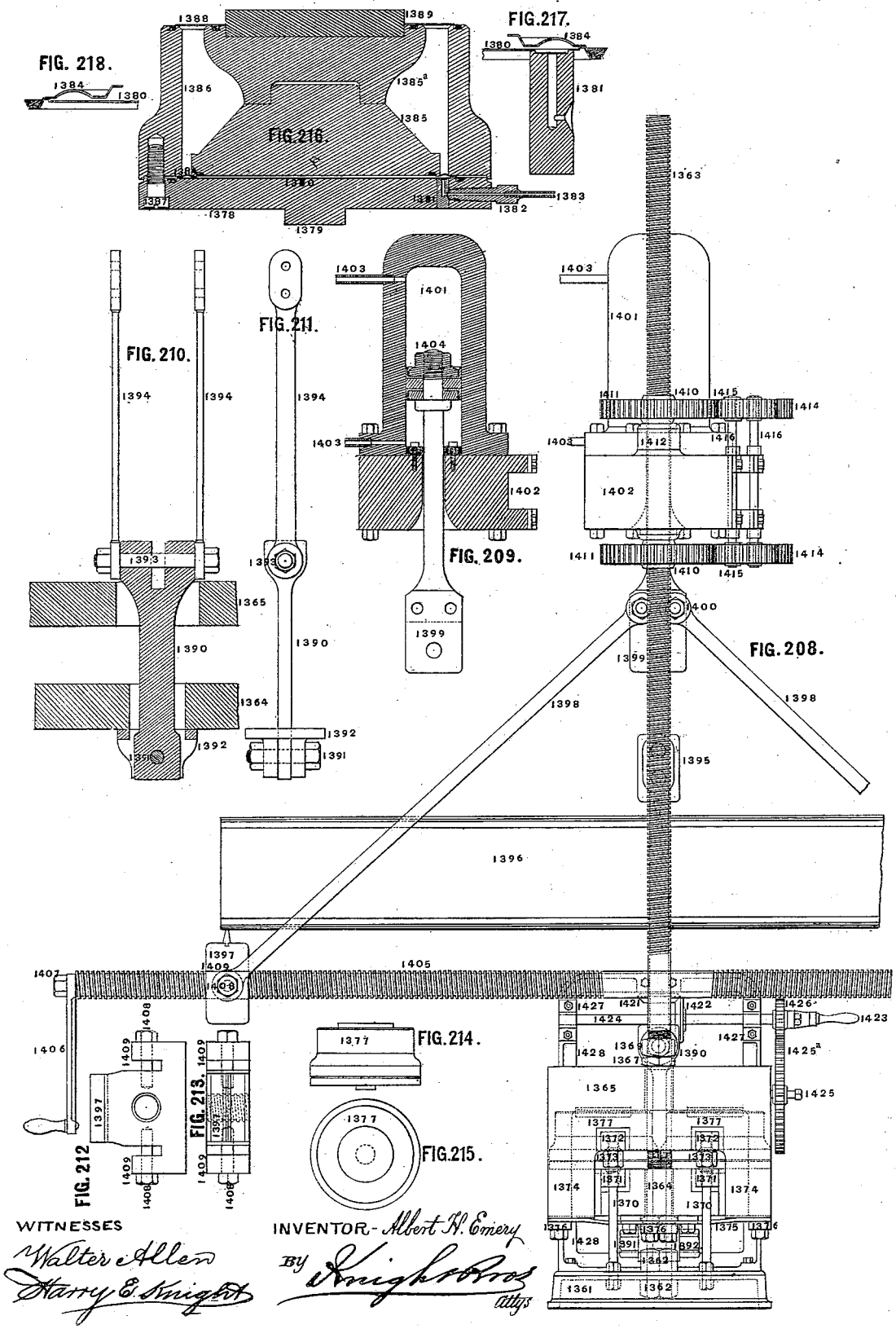

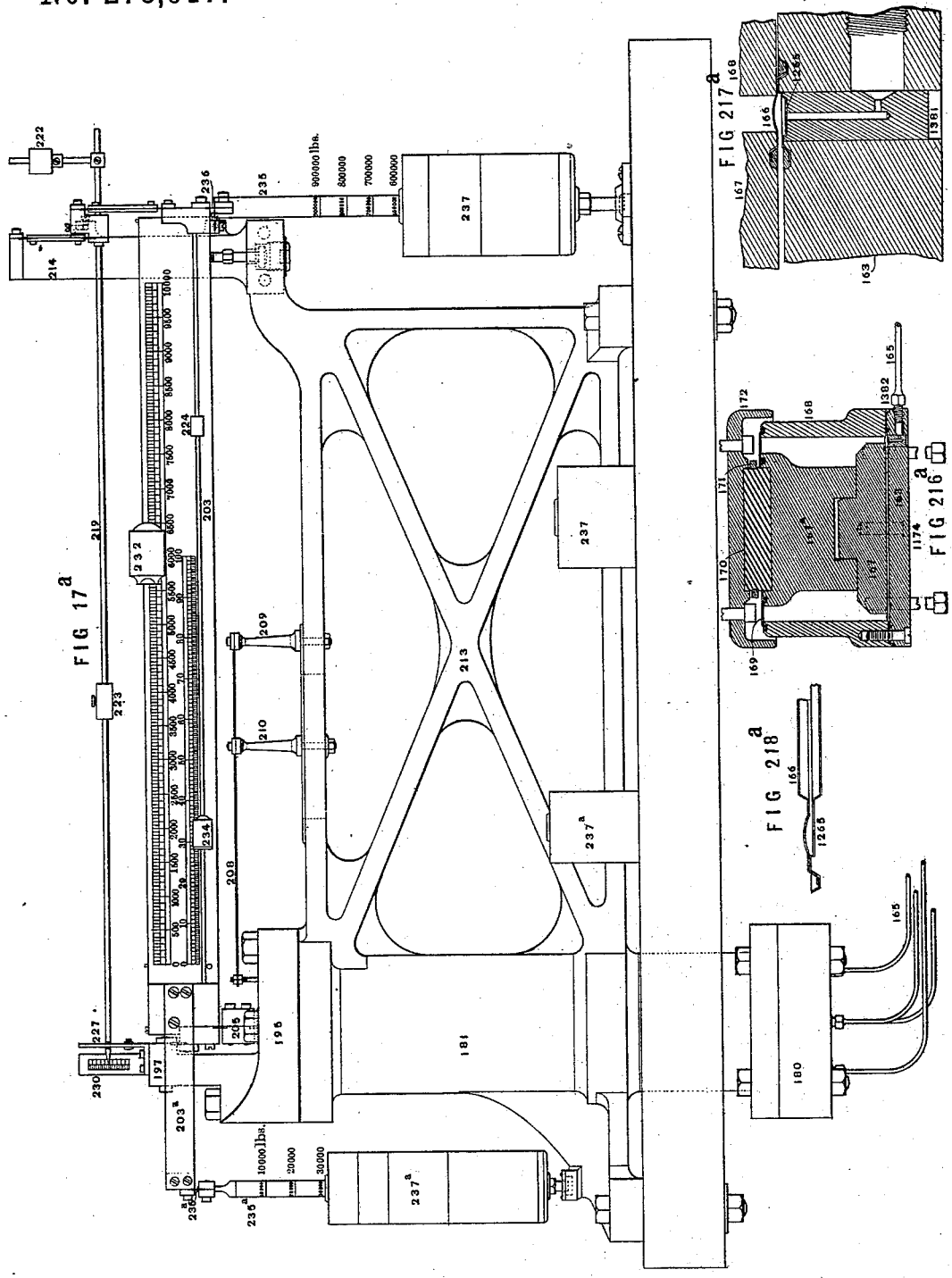

(No Model.) 4 Sheets—Sheet 4.
A. H. EMERY.
MACHINE FOR TESTING THE STRENGTH OF MATERIALS.
No. 278,917. Patented June 5, 1883.
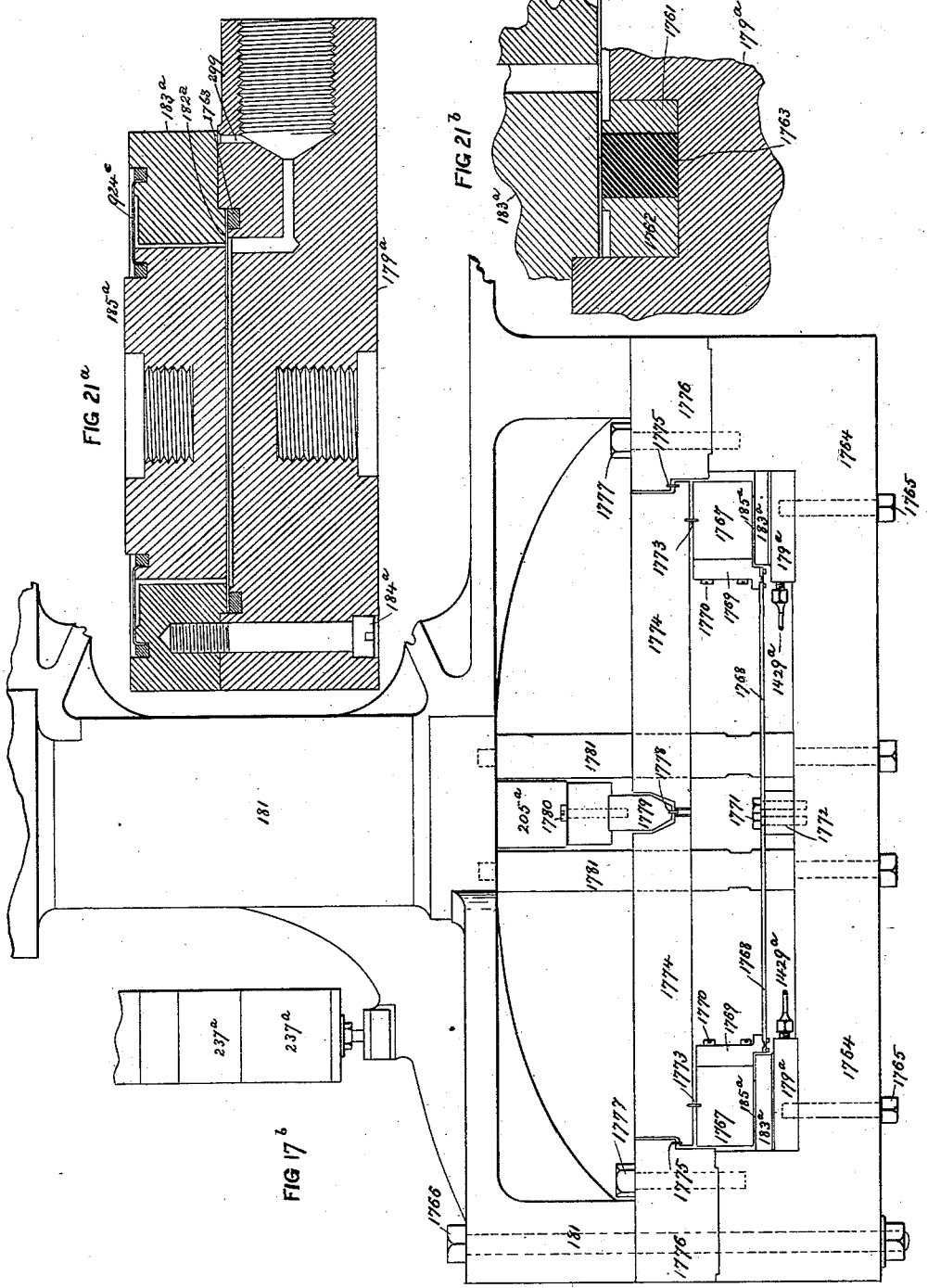
WITNESSES:
Walter Allen
Harry E. Knight
INVENTOR.
Albert H. Emery
Knight Bros

United States Patent Office.

ALBERT H. EMERY, OF NEW YORK, N. Y., ASSIGNOR TO THE EMERY SCALE COMPANY, OF STAMFORD, CONNECTICUT.

MACHINE FOR TESTING THE STRENGTH OF MATERIALS.

SPECIFICATION forming part of Letters Patent No. 278,917, dated June 5, 1883.

Application filed February 5, 1881. (No model.)

*To all whom it may concern:*

Be it known that I, ALBERT H. EMERY, of the city, county, and State of New York, have invented certain new and useful Improvements in Machinery for Testing the Strength of Materials, of which the following is a specification.

The machine is constructed with coupled load-beams constituting, respectively and interchangeably, the bed and platform of a scale, and with a straining-beam connected to the aforesaid coupled load-beams by screws, on which it is moved by gearing, hereinafter described, either for adjustment or to produce a strain of tension or compression. A hydraulic press is combined with the straining-beam for applying greater strains. One of the coupled beams is constructed with lugs projecting near to or beyond the other beam, so that fixing-plates may be attached at their extremities to the said projecting lugs and at their central parts to the inner or outer face of the other beam, to secure the said beams against relative lateral motion. The fixing-plates constitute, also, springs to press the coupled beams upon their interposed pressure supports or levers, as the case may be. The connecting and straining screws pass through apertures of larger diameter in the beam, and are provided with cone-faced nuts engaging in said apertures to afford a rigid bearing for the beam which constitutes for the time being the bed of the scale, the conical form of the nut-face serving to center the screws within the apertures, so as to prevent their contact with the free or load beam. The beams are adjusted longitudinally on the straining-screws, so as to set either of them against the cone-nuts, by means of two pairs of setting-rods fixed in the bed of the testing-machine and passing through lugs projecting laterally from each of the beams. Cone-faced nuts working on said setting-rods between the lugs serve to confine either beam to its bearings, and at the same time, by the conical shape of the faces of said nuts, to center the setting-nuts within the eyes of the lugs, so as to avoid friction against the free or load beam. By the use of two pairs of setting-rods the beam is secured against tipping or rotation. The load is transmitted from the load-beam to hydraulic-pressure supports interposed between the coupled beams. The base of each support is provided with a continuous lining of sheet metal attached to a plug formed with a conducting-aperture communicating with a coupling and sealing plug inserted radially to the first plug, and having the liquid-pressure pipe permanently connected to it. Rubber or other elastic material is interposed between the support-columns and one or both of the beams, to permit the slight lateral motion of the supports relatively to each other and to the beams caused by the springing of the beams, and the consequent lateral extension and contraction of their respective surfaces. For applying transverse strains a truss is provided with a chord-beam constructed with right and left screw-threads for the adjustment thereon of load-bearings, by which the strain is applied to a specimen of any required length. The movement of the straining-beam for straining or adjustment is effected by a crank and gearing operating through a splined shaft, driving-gears mounted on the beam, and operating cogged nuts thereon, which work on the straining-screws, as hereinafter described. Suitable chambers and mechanism are provided, as hereinafter described, for receiving pressures of great intensity, which are conveyed to them directly from the pressure-supports of the scales and transmitted, in reduced ratio, to the pressure-column in the weigh-frame for measurement.

In the accompanying drawings the invention is represented by twenty-five figures, as follows: Figure 201 is a front elevation of a machine with the apparatus for applying a transverse load, and a specimen in position receiving such load. Fig. 202 is a plan of the same. Fig. 203 is a plan with the upper part of the machine and a part of the upper one of the coupled beams removed. Fig. 204 is a longitudinal section of a grooved driving-sleeve for moving the straining-beam. Fig. 205 is a transverse section of the same. Fig. 206 is an elevation, on a larger scale, partly in section, of portions of one of the coupled load-beams and one of the straining-screws, showing the lock-nuts thereon. Fig. 207 is a longitudinal section of connected portions of the two load-beams and one of the setting-rods with the nut applied thereto. Fig. 208 is a side elevation of the machine with the transverse straining-apparatus and a specimen in position. Fig. 209 is a longitudinal section of the hydraulic straining-press, showing in transverse section the straining-beam to which it is applied, and in elevation the straining-bar constituting the piston-rod of the press. Fig. 210 shows a section of a beam-link and beam-block and portions of the coupled beams, and an elevation of load-links connected therewith. Fig. 211 is a side view of the same parts, excepting the coupled beams. Fig. 212 is a side view of one of the bearings of the straining-truss. Fig. 213 is a plan view of the same. Fig. 214 is an elevation of a hydraulic-pressure support. Fig. 215 is a plan of the same. Figs. 216 and 216ª show longitudinal sections thereof on a larger scale. Figs. 217 and 217ª show sections, on a still larger scale, of a portion of the pressure-diaphragm and lining-plate made continuous, so as to extend over the whole area of the column, instead of in the annular form shown in Fig. 216, and conducting-plug permanently attached to the lining-plate. Figs. 218 and 218ª show sections of another portion of the pressure-diaphragm and lining-plate. Fig. 17ª is a side elevation of the weigh-frame, beams, indicator, and weights of a one-million-pound scale. Fig. 17ᵇ shows a portion of the weight-frame with reducer attachments connected therewith. Fig. 21ª shows a section, on an enlarged scale, of one of the small pressure-chambers of the reducer. Fig. 21ᵇ shows a greatly-enlarged section of the diaphragm and means for sealing the same.

1361 represents the stationary bed of the machine, to which are rigidly connected by nuts 1362 the straining-screws 1363. The said screws pass through openings of larger diameter in the coupled load-beams 1364 1365.

1366 1367 represent cone-faced nuts working on the screws 1363, and constituting the bearings of the one of the coupled beams 1364 1365 which for the time being constitutes the bed of the scale, as hereinafter described. The conical form of the faces of the nuts 1366 1367 causes them to hold the beams with their apertures concentric with the screws 1363, so that the free or load beam may be prevented from contact or friction against the said screws, the relative lateral motion of the beams being prevented by devices presently to be described.

1368 1369 represent lock-nuts to fix the respective nuts 1366 1367.

1370 represents fixing-rods rigidly secured in the bed 1361 of the machine, and passing through apertures of larger diameter in lugs 1371 1372, projecting from the ends of the respective beams 1364 1365.

1373 are nuts, cone-faced on both ends, working on the setting-rods 1370 and bearing against the lugs 1371 1372 to press either of the beams 1364 1365 which is to constitute the bed of the scale against its bearing-nuts 1366 or 1367. The conical form of the faces of the nuts 1373 causes them to center the rods 1370 within the apertures of the lugs 1371 1372, so as to prevent contact or friction between the rods 1370 and the free or load beam. If permitted by the dimensions of the pressure supports or levers, as the case may be, which are interposed between the coupled beams 1364 1365, setting-nuts 1373 may be applied to the screws 1363, so as to dispense with separate setting-rods. By the use of two pairs of setting-rods 1370 at a sufficient distance asunder laterally in respect to the beams, the said beams are not only moved, as before explained, and held firmly against their bearings, but the beam which constitutes for the time being the bed of the scale is rigidly fixed against tipping or rotary motion. One of the beams, 1365, is constructed with projecting lugs or brackets 1374, which may extend, as illustrated in Figs. 201, 207, and 208, completely across the beam 1364, so as to bring the ends of said lugs or brackets nearly in the same plane with the back of the said beam 1364. This admits of the attachment of fixing-plates 1375 at their centers to the back of the beam 1364 and at their extremities to the sides of the lugs 1374 of the beam 1365 by means of clamps and screws 1376, which hold the plates against relative motion laterally in the machine. The plates 1375 constitute springs tending to press the beams 1364 and 1365 together, so as to hold them firmly and with the proper initial pressure upon the hydraulic-pressure supports or levers which are interposed between them. The fixing-springs 1375 may, if preferred, be applied to the inner face of the beam 1364, and to lugs 1374 on the upper beam, extending near the inner face of said beam 1364 instead of completely across the same, as in the present illustration.

In the present illustration the invention is represented in connection with hydraulic-pressure supports, which are shown at 1377. One of these supports is shown in elevation in Fig. 214, and in plan in Fig. 215. Their construction is illustrated in detail on a larger scale in Figs. 216 to 218ª. The support is constructed with a chambered base, 1378, from which projects a lug, 1379, to secure it against lateral motion. The working-surface of the base is covered with a lining-plate, 1380, or partly covered by the annular plate 1265, soldered, as shown, to a conducting-plug, 1381, the duct in which communicates through the lining with the interior of the chamber, and at its other end laterally with the coupling and sealing plug 1382, to which the liquid-pressure pipe 1383 is permanently attached. A cavity in the plug 1381, receiving the convex end of the coupling-plug 1382, causes the screwing in of the last-named plug to fix the conducting-plug 1381 firmly in position, while the ducts in the two plugs are brought into communication. The lining 1380 or 1265 is soldered at its periphery to an annular diaphragm, 1384 or 166, the inner edge of which is fixed by soldering or other means to the column-base 1385 or 167. The soldered or united edges of the plate 1380 and diaphragm 1384 are afterward securely clamped upon the base 1378 by the casing 1386 by means of tap-screws 1387, as I have described in another application of even date herewith. The upper member, 1385ª, of the pressure-column is connected by a flexible fixing-plate, 1388, with the upper edge of the case 1386, so as to hold the said column against lateral motion. The top of the column is recessed, as shown, for the reception of a block, 1389, of rubber or other yielding material, on which may be placed a cap, 172, or on which the beam 1365 may rest directly, if preferred, the said yielding block being similarly recessed into the beam or cap, as the case may be. The rubber is confined against expansion by its containing-recesses, but permits to the coupled beams slight relative motion laterally, so as to permit the free action of the pressure-supports and prevent their constraint by the extension and compression of the surfaces of the respective beams by the strains to which they are subjected.

In Figs. 201, 208, 210, 211, 1390 represents a beam-link connected by a bolt, 1391, to a beam-block, 1392, resting on the back of the beam 1364. Said link 1390 passes without contact through apertures in the two beams 1364 1365, and is connected at its other end by a bolt, 1393, to the load-links 1394, which are bolted to the center bearing, 1395.

1396 represents a specimen I-beam undergoing transverse strain. The bearing 1395 rests on the center of said specimen, being connected with the load-beam 1364 of the machine, as before stated, while the specimen is strained by the pressure applied to its end through the bearings 1397, links 1398, and straining-bar 1399. The links 1398 are connected to the straining-bar 1399 by bolts 1400, the bar 1399 constituting in this illustration the piston-rod of a hydraulic press, 1401, which is attached to the straining-beam 1402.

1403, Figs. 208 and 209, represents liquid-pressure pipes of the hydraulic press, and 1404 the piston thereof, connected with the straining-bar 1399. The straining-bearings 1397 are threaded to constitute right and left screw-nuts fitting the right and left screw-threads on the truss-chord 1405, which is rotated by a crank, 1406, retained by a nut, 1407, for the purpose of setting said bearings at any distance asunder to suit the length of the specimen to be tested. The straining-links 1398 are connected to the bearings 1397 by bolts 1408, passing through lugs 1409 and into said bearings, as shown in Fig. 201. The straining-beam 1402 is provided with two pairs of nuts, 1410, working on the straining-screws 1363 and forming the eyes or hubs of cog-wheels 1411, which may be cast in one with the said nuts or rigidly keyed thereto. The faces of the nuts work against bearings or bosses 1412 on each face of the straining-beam, so that the rotation of the nuts will move the beam in either direction, either for adjustment or for producing strains of tension or compression. The hydraulic press 1401 is used for producing heavier strains. The screw-gearing sets and retains the beam in any position. Motion is communicated between the wheels 1411 of the nuts on either face of the straining-beam by intermediate gear-wheels, 1413 1414 1415, mounted on shafts 1416. The rotation of the wheels 1411 for moving the beam, as before stated, is produced by driving-pinions 1417, fixed by nuts 1417ª to a sleeve, 1418, which is shown in section in Fig. 204, and has its bearings in the straining-beam 1402. This sleeve is provided with an internal spline, 1419, as shown in section in Fig. 205, to work in a groove in the driving-shaft 1420, which is driven by beveled pinions 1421 1422 and a crank, 1423, which may be placed on the shaft 1424 of the pinion 1422, or on the shaft 1425 of a multiplying-gear, 1425ª, gearing with the small pinion 1426 on said shaft 1424, so that the movement of the beam may be more or less rapid. The lower end of the shaft 1420 and the shafts 1424 and 1425 run in boxes 1427 on the frame 1428, which is bolted to the bed 1361. The quick movement through the medium of the multiplying-gear 1425ª 1426 is used for adjusting the beam when not under strain. The slower and more powerful movement by the application of the crank directly to the shaft 1424 is used for producing strains. The long sleeve 1418 may be dispensed with, if preferred, the two pinions 1417 running in separate bearings on the straining-beam 1402, and having their own splines to work in the groove of the shaft 1420, so that they may slide freely on the said shaft together with the straining-beam and derive rotation therefrom in any position of the straining-beam.

1429 are liquid-pressure pipes communicating from the supports 1377 to pressure-chambers of the weighing apparatus which is contained in the case 1430, as hereinafter more fully described.

Lever weighing mechanism which I have described in detail in other applications of even date herewith may be substituted for the hydraulic apparatus here shown.

The above description and the accompanying drawings illustrate the invention in its application to producing transverse strains on specimens; but the machine is equally applicable to producing strains of compression or tension. For producing strains of tension the beams 1364 1365 are adjusted as in the present illustration, and suitable specimen-holders are applied to the beam-link 1390 and the straining-bar 1399. For producing strains of compression the nuts 1373 are turned down on the rods 1370, so as to force the beam 1364 against the coned nuts 1366, making the said beam 1364 the scale-bed. The beam 1365 now becomes the load-beam of the scale and receives the specimen, which is compressed between the said load-beam and the straining-beam 1402 by a reverse movement of the beam 1402 by the gearing described, or by the pressure of the press-piston 1404.

In cases of machines with scales to bear small loads only, the hydraulic-pressure supports 1377 of the scale are connected directly with small chambers resting in the base-piece 180 of the weigh-frame 181, Fig. 17ª, where the pressure-columns of these small pressure-chambers act directly against the main pressure-column 205 of the scale, connecting through its fulcrum directly with the main beam 203; but when the pressures are large I prefer the construction shown in Figs. 17ᵇ, 21ª, and 21ᵇ, where I show mechanism to reduce the proportional load on column 205 by interposing between it and the small chambers reducing-levers, which mechanism in the aggregate I call a "reducer." This consists, first, of a base-piece, 1764, of suitable form, which is here shown as secured to the weigh-frame 181 of the scale by the bolts 1766 and 1781. Connected with this base-piece 1764 are the fulcrum-blocks 1776, secured thereto by bolts 1777. This fulcrum-block may be made in one piece with the bed-piece 1764, or as part of 181, if preferred, but is preferably made separate, of steel, as here shown, in which case the fulcrum-plate 1775 may be pressed in grooves at both ends, which is very desirable. On this bed-piece 1764 are set one or more small pressure-chambers, connecting directly by small pipes with the main supports 1377 of the scale, of which there are one, two, four, six, or more. In this case there are four. If two only were used, the chamber-bases 179ª, connected therewith, might both be at one end of the reducer, one in front of the other, or one at each end. In the present instance there are two at each end, one of each pair only being seen, the others being directly behind them. These chambers are secured to the base-piece 1764 by screws 1765. The chambers themselves consist of a base or chamber plate, 179ª, casing-ring 183ª, pressure-column 185ª, and diaphragm 182ª, The pressure-column 185ª is secured to the casing-ring 183ª by the diaphragm 924ᶜ, securely fastened to both it and the ring. To be sure of sealing the chamber perfectly, the diaphragm 182ª may be packed by a lead ring, as shown in Fig. 21ª. The chamber in the upper side of the base-piece 179ª is extended out at the sides toward the sealing-ring 1763, Fig. 21ª, until the width of the ledge constituting the wall of the chamber which separates the chamber from the sealing-ring 1763 is so narrow or thin that if of soft steel or other suitable metal it will yield so far as to allow the surfaces of the ledge and sealing-ring to be brought firmly in contact with the diaphragm 182ª, or other sealing-surface, all around, so that the sealing becomes perfect. In cases where the base-piece is not very soft I prefer the mode shown in enlarged section in Fig. 21ᵇ, where I make use of a bronze or brass ring, 1762, and lead ring 1763, both firmly pressed in place, and then dressed, as shown. If the chamber-base 179ª is of soft steel or soft iron, it should be dressed with a thin lip extending up to the top of the lead, as shown in the ring 1762; or, if preferred, the packing-groove may be made wider, and a bronze or brass ring, 1761, pressed in and dressed off like 1762. These concentric bronze rings are pressed in before the lead rings 1761 1762 1763 are, and then all are finished together, a very small lip extending up each side of the lead, which keeps it from flowing out of place, when the case 183ª is firmly secured to the chamber-base 179ª by the screws 184ª, the latter also serving to press the diaphragm 182ª sufficiently on the lead 1763 to seal the chamber. The pressure-columns 185ª may act directly against the levers 1774; or there may be interposed between them a fulcrum, 1773, and pressure block or column 1767, which is fixed against rotation at the bottom by the steel plate 1768, the latter being secured to the column 1767 by the clamp-piece 1769 and screws 1770, and to the bed-piece 1764 by the screws 1771 and clamp piece or lug 1772. The levers 1774 have fixed fulcrums 1775 at one end, and a movable fulcrum, 1778, at the free end, this fulcrum connecting with the pressure-column 1779, which is made in one with 205ª, or compound, as here shown, where the two parts 1779 205ª are secured together by the screws 1780. The lever 1774 is best made of soft steel and grooved for the fulcrums 1775 and 1778, which are pressed very tightly into their grooves.

Details not fully described above which are essential in any of the various modes of applying the machine are fully described in other applications of even date herewith.

Whatever novel subject-matter I have set forth and not claimed or attempted to claim herein I have claimed or attempted to claim in other applications, or have reserved to be claimed in future original applications.

The following is here claimed as new:

1. The combination, with the straining-beam 1402 and screws 1363 for moving and holding the same, of a press for producing a strain of tension or compression, the cylinder of said press being made separately from the beam and secured thereto.

2. In a pair of coupled beams, the lugs or brackets 1374, projecting from the beam 1365, for the attachment of plates to stay the beams against relative lateral motion, as set forth.

3. The combination, with a pair of coupled beams, of fixing-plates 1375, connected at their extremities to one of the said beams and at their central parts to the other, as set forth.

4. The combination, with a pair of coupled beams, 1364 1365, of elastic fixing-plates 1375, applied, substantially as herein set forth, to hold the beams firmly against the interposed supports.

5. The combination, with the coupled beams 1364 1365 and straining-screws 1363, of the coned nuts 1366 1367, operating, substantially as set forth, to keep the free or platform beam from contact with the straining-screws.

6. In combination with the straining-screws and movable scale-beam of a testing-machine, coned nuts for centering the beams relatively to the screws, substantially as set forth.

7. The combination, with the screws 1363 and beam 1364 or 1365, of coned nuts 1366 or 1367, to center the said beam relatively to the screws, substantially as set forth.

8. In combination with the straining-screws 1363, coned nuts 1366 or 1367, and scale-beam 1364 or 1365, the setting-rods 1370 and coned nuts 1373, the whole constructed and operating substantially as and for the purposes set forth.

9. The combination, with the coupled beams 1364 1365 and the bed 1361 of the testing-machine, of two pairs of setting-rods, 1370, and nuts 1373, so placed as to secure the beams against tipping or rotary motion, as set forth.

10. The continuous lining 1380, applied in connection with the base 1378 and diaphragm 1384, substantially as and for the purposes set forth.

11. The combination of the base 1378, lining-plate 1380, and the conducting-plug 1381, attached to the lining-plate, substantially as set forth.

12. The combination of the lining-plate 1380, conducting-plug 1381, and coupling and sealing plug 1382 with the base 1378, substantially as and for the purposes set forth.

13. In a testing-machine, the combination of a pair of coupled beams and a set of hydraulic-pressure supports with rubber or other elastic material interposed between the supports and one of the coupled beams to allow the lateral movement of the supports caused by the lateral extension and compression of the surfaces of the beams.

14. The truss-chord 1405, constructed with a right and left screw-thread, in combination with the load-bearings 1397, substantially as set forth.

15. The combination of the straining-beam 1402, screws 1363, cogged nuts 1410, gearing 1411 1413 1414 1415 1417, driving-shaft 1420, and suitable driving mechanism, substantially as set forth.

16. The packing-ring 1763, in combination with one or more confining-ledges adapted to yield at points having undue prominence and cause an effective bearing completely around the sealing-surface, substantially as described.

17. The sealing-rings 1762 1763 and chamber-base 179$^a$, in combination with a sealing-surface, 182$^a$, as and for the purposes set forth.

18. The sealing-ring 1763 and confining-rings 1760 and 1762, in combination with a suitable sealing-surface, 182$^a$, substantially as and for the purposes set forth.

19. The pressure-chamber, in combination with the base-piece 1764, lever 1774, fulcrum 1775, fulcrum 1778, and column 1779, as and for the purposes set forth.

20. The pressure-chamber, in combination with the base-piece 1764, lever 1774, fulcrums 1775 1778, fulcrum-block 1776, and column 1779, as and for the purposes set forth.

21. The combination of the base 1764, two or more pressure-chambers, fulcrum-blocks 1776, fulcrums 1778, and column 1779, substantially as and for the purposes set forth.

22. The small pressure-columns 185$^a$, in combination with the transmitting-column 1767, fulcrum 1773, lever 1774, fulcrum 1778, and column 1779, as and for the purposes set forth.

23. The combination of two or more small chambers with the base-piece 1764, one or more levers, 1774, fulcrum 1778, and column 1779, as and for the purposes set forth.

24. The combination of the fixing-plate 1768, base-piece 1764, and column 1767, as and for the purposes set forth.

ALBERT H. EMERY.

Witnesses:
OCTAVIUS KNIGHT,
WALTER ALLEN.